United States Patent
Kato

(10) Patent No.: US 6,240,137 B1
(45) Date of Patent: May 29, 2001

(54) ENCODING APPARATUS AND METHOD, DECODING APPARATUS AND METHOD, AND EDITING METHOD

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/050,586

(22) Filed: Mar. 30, 1998

(30) Foreign Application Priority Data

Apr. 3, 1997 (JP) .................................................... 9-085319

(51) Int. Cl.[7] ........................................................ H04N 7/18
(52) U.S. Cl. ................................ 375/240.26; 375/240.28
(58) Field of Search ............................... 345/556; 348/13, 348/419, 423, 464, 462, 387, 386, 422; 386/125, 126, 61, 55; 375/240.26, 240.28

(56) References Cited

U.S. PATENT DOCUMENTS

| | | | |
|---|---|---|---|
| 5,724,091 | * 3/1998 | Freeman et al. | 348/13 |
| 5,838,876 | * 11/1998 | Iwamura | 386/125 |
| 5,923,869 | * 7/1999 | Kashiwagi et al. | 395/556 |
| 5,959,690 | * 9/1999 | Toebes, VIII | 348/416 |

FOREIGN PATENT DOCUMENTS

| | | |
|---|---|---|
| WO 96/17492 | 6/1996 | (WO) . |
| WO 97/03443 | 1/1997 | (WO) . |

OTHER PUBLICATIONS

Rangan, P.V. et al.: "Continuity and Synchronization in MPEG" IEEE Journal on Selected Areas in Communications, vol. 14, No. 1, Jan. 1, 1996, pp. 52–60, XP000548810.

Weiss, S.M.: "Switching Facilities in MPEG–2: Necessary but not Sufficient" SMPTE Journal, vol. 104, No. 12, Dec. 1, 1995, pp. 788–802, XP000543847.

* cited by examiner

*Primary Examiner*—A. Rao
(74) *Attorney, Agent, or Firm*—Frommer Lawrence & Haug, LLP.; William S. Frommer; Dexter T. Chang

(57) ABSTRACT

A moving picture signal is coded in the GOP configuration and recorded on a writable disc medium or the like so that a user can edit the signal, selecting a reproduction route, which can be decoded into a seamless picture reproduction.

An input moving picture signal is encoded in the GOP configuration of the MPEG as follows. A coding difficulty calculation circuit 209, a bit rate specifier 210, and a rate controller 211 control a coding bit amount of the input moving picture signal, assuming a bit occupation amount of a buffer memory used during decoding. A video encoder 202 encodes the input moving picture signal according to the aforementioned coding bit amount. A multiplexer 204 generates an output bit stream from the input moving picture signal coded and another coded signal. The encoding is carried out in such a way that the total of maximum values the bit rates of the respective signals is smaller than the input bit stream to a buffer memory of a decoder.

11 Claims, 7 Drawing Sheets

NOTE : EACH ARROW FROM ONE FRAME TO ANOTHER INDICATES THE DIRECTION OF PREDICTION

PICTURE TYPE : I, P, B, PICTURES

τx : SEQUENCE TIME FROM AN IN POINT TO AN OUT POINT IN EDITION

τx >= (BV+BT)/(RBin−REmax)

BV = 1.75Mbit
BT : TRACK BUFFER SIZE
BT >= RBin*seek_time

BB = 2*BV−RBin/P+BT
τx <= (BV+BT)/(RBin−REmax)

ENCODING APPARATUS AND METHOD, DECODING APPARATUS AND METHOD, AND EDITING METHOD

BACKGROUND OF THE INVENTION

1. Field of the Invention

The present invention relates to an encoding apparatus and method, a decoding apparatus and method, and an editing method which can preferably be used for effectively encoding, for example, a digital video signal and a digital audio signal, recording the signals on a recording medium such as a magneto-optical disc, editing, decoding and displaying the contents of the signals.

2. Description of the Related Art

In general, as a digital video signal has a quite large data amount, when recording a digital video signal for a long time on a recording medium having a small size recording medium having a small memory capacity, when transmitting a digital video signal through a communication route of a limited capacity with a plenty of channels, it is indispensable to effectively encode the digital video signal. In order to answer such a request, there have been suggested effective encoding systems utilizing a video signal correlation. One of such systems is the MPEG (Moving Picture Experts Group) system.

The MPEG system removes redundancy of the video signal in the time axis direction by using a difference between frames and then removes redundancy in the spatial axis direction by using an orthogonal conversion method such as the discrete cosine transform (DCT), thus enabling to effectively encode the video signal.

In the MPEG encoding, each of the frames is defined as an I picture, P picture or B picture for compressing a video signal. Moreover, in the MPEG system, in order to enable a random access reproduction (reproduction starting in a halfway) of the GOP (group of pictures) unit among the moving picture sequence, each GOP is added with a GOP start code as an identifier.

On the other hand, in the MPEG encoding system, a decoder detects a GOP start code of the GOP specified in the coding information (bit stream), so as to start decoding in that GOP, enabling to carryout reproduction in the middle of a moving picture sequence.

For example, as shown in FIGS. 1A and 1B, a video signal of nine frames from frame F0 to F8 is defined as a GOP and each of the nine frames is encoded as an I picture, P picture, or B picture. The frames of I picture are encoded with their video data alone (intra coding) and transmitted. As for the frames of P picture, basically as shown in FIG. 1A, a frame of I picture of P picture which is preceding temporally is used as a prediction picture and a prediction residue signal is encoded and transmitted (forward predictive coding). Furthermore, a frame of B picture, basically as shown in FIG. 1B uses a reference frame in the past and a reference frame in the future as prediction pictures so that a prediction residue signal is coded and transmitted (bidirectional prediction coding). It should be noted that for the frames F0 and F1 which have no reference frame in the past, only the reference frames in the future are used as prediction frames so that a prediction residue signal is coded and transmitted (backward prediction coding).

If a moving picture signal coded in the GOP configuration is recorded on a recording medium such as an optical disc capable of random access, a user can select a start point of reproduction by the GOP unit. For example, as shown in FIG. 2, if a bit stream is assumed to consist of GOP-0 to GOP-(n+1), it is possible to random access to the n-th GOP (GOP-n) indicated by random_access in the figure and start reproduction at that point. As a representative application of this, there can be exemplified a video CD for recording a compressed video signal on a so-called compact disc (trade name) and a digital video disc (trade name: DVD) dedicated for read out.

Recently, an attention is paid on a writable disc medium of a large capacity such as a DVD-RAM. If a moving picture signal can be recorded on the DVD-RAM, in comparison to an application for recording a conventional magnetic tape medium, it becomes easier to carry out a random access reproduction and a skip reproduction as well as edition. Here, the aforementioned skip reproduction is a reproduction as shown in FIG. 3 which shows a coded information bit stream consisting of 0-th to m-th GOPs (GOP-0 to GOP-m), for which a reproduction is carried out while skipping a portion defined by the output point indicated by out-1 and the in point indicated by in-1 in the figure and a portion defined by an out point indicated by out-2 and an in point indicated by in-2 in the figure.

This skip reproduction is used in practice, for example, in the so-called MD (trade name: Mini Disc) for an audio data. According to this skip reproduction, a user can select a reproduction route on a frame (a predetermined number of sample data) basis from an audio signal recorded on the disc by the user. When reproduction is carried out in the selected route, it is possible to reproduce continuously (seamless) without causing a feeling of interruption to the user. In the case of audio MD, in order to realize a seamless skip reproduction, a track buffer memory is provided at a stage preceding an audio decoder, so that while an optical pickup is searching from an out point to an in point, i.e., while a data read out from the disc is halted, a data amount required to continue reproduction is read out in advance from the disc and is stored in the track buffer memory. Because in the MD all the frames of the audio signal coded with a high efficiency are coded with an identical bit amount, even if any route is selected, the track buffer memory will not underflow or overflow, enabling to carry out seamless reproduction.

On the other hand, for encoding a moving picture signal in the GOP configuration and recording it on an optical disc medium, there has been made no sufficient study on the method for realizing seamless skip reproduction.

That is, the coded bit amount of respective frames of a moving picture signal which has been coded with a high efficiency varies depending on the picture type I, P, and B as well as the picture contents. Consequently, when coding a moving picture signal, it is necessary to control the coded bit amount of the frames which are successively inputted, so as to allow underflow and overflow of the input buffer memory of a decoder. Here, if a skip reproduction with a reproduction route change causes a change of the input frame order to the input buffer memory of the decoder, there is a possibility that the input buffer memory of the decoder underflows or overflows.

For this, conventionally, when carrying out a skip reproduction, prior to reading out the GOP of the skip destination, the input buffer memory of the decoder is cleared off in advance and then read out of the GOP of the skip destination is carried out. However, in this method, a delay (start up delay) occurs before starting decoding of the GOP of the skip destination and it is impossible to realize a seamless video reproduction between the last frame of the skip start position and the first frame of the skip destination.

Moreover, as another example, in the aforementioned DVD-video, a creator (director) of the disc determines in advance the points at which the reproduction route can be changed, and a data is logically recorded on the disc so that skip reproduction can be carried out in seamless if the reproduction route is within this limit. Consequently, if the reproduction route is out of this limit defined by the director, there is no guarantee that a seamless picture reproduction can be obtained.

SUMMARY OF THE INVENTION

It is therefore an object of the present invention to provide an encoding apparatus and method, a decoding apparatus and method, and an editing method which enable to encode a moving picture signal in the GOP configuration and record the signal on a writable disc medium or the like, so that a user can edit the data by selecting a picture reproduction route and decode the moving picture through this reproduction route, enabling to carry out a seamless picture reproduction.

In the encoding apparatus and method according to the present invention, when encoding input digital signals in a predetermined coding group configuration consisting of a plurality of frames, a coding bit amount of the input digital signal is determined according to a bit occupation amount of a buffer memory assumed to be used during decoding, and an output bit stream is generated from the coded input digital signals and another coded digital signal. The coding bit amount is determined in such a way that the input bit rate to the buffer memory used during decoding is greater than the total of maximum values of bit rates of the coded digital signals.

In the decoding apparatus and method according to the present invention, when decoding a coded digital signal coded in a predetermined coding group configuration consisting of a plurality of frames, an accumulation amount of the coded digital signal is detected and the accumulation is controlled according to the detected accumulation amount and an input timing information added to the coded digital signal, and accumulation is carried out ignoring an input timing information added to the coded digital signal if the accumulation means have an empty area in the bit occupation amount when the reproduction control signal specifies a skip reproduction with a skip from a skip start point to a skip destination point, thus enabling to achieve the aforementioned object.

In the editing method according to the present invention, when editing and reproducing a recording medium containing a coded bit stream which has been coded in a predetermined coding group configuration consisting of a plurality of frames of a digital signal, the method comprising, if a skip reproduction is to be specified, the first frame of the coded group is set as a reproduction skip destination and the minimum value of the length from the skip destination to the next skip start point is set to a predetermined value, so as to achieve the aforementioned object.

That is, according to the present invention, in order to enable a seamless skip reproduction of a digital signal such as a moving picture recorded on a recording medium for example, in a coding group unit such as GOP, the maximum value of the coding bit rate during encoding is set to a smaller value than the input bit rate to a decoder, and during edition, the minimum value of a length from an in point to the next out point is defined,, so that when decoding an edited stream, the stream can be inputted at any time ignoring an input timing information if the buffer of the decoder has an empty area.

DETAILED DESCRIPTION OF THE PREFERRED EMBODIMENTS

Description will now be directed to embodiments of the present invention with reference to the attached drawings.

Firstly, explanation will be given on an encoding apparatus and method according to an embodiment of the present invention with reference to FIG. 4 which shows a moving picture signal recording apparatus.

Figure 4:
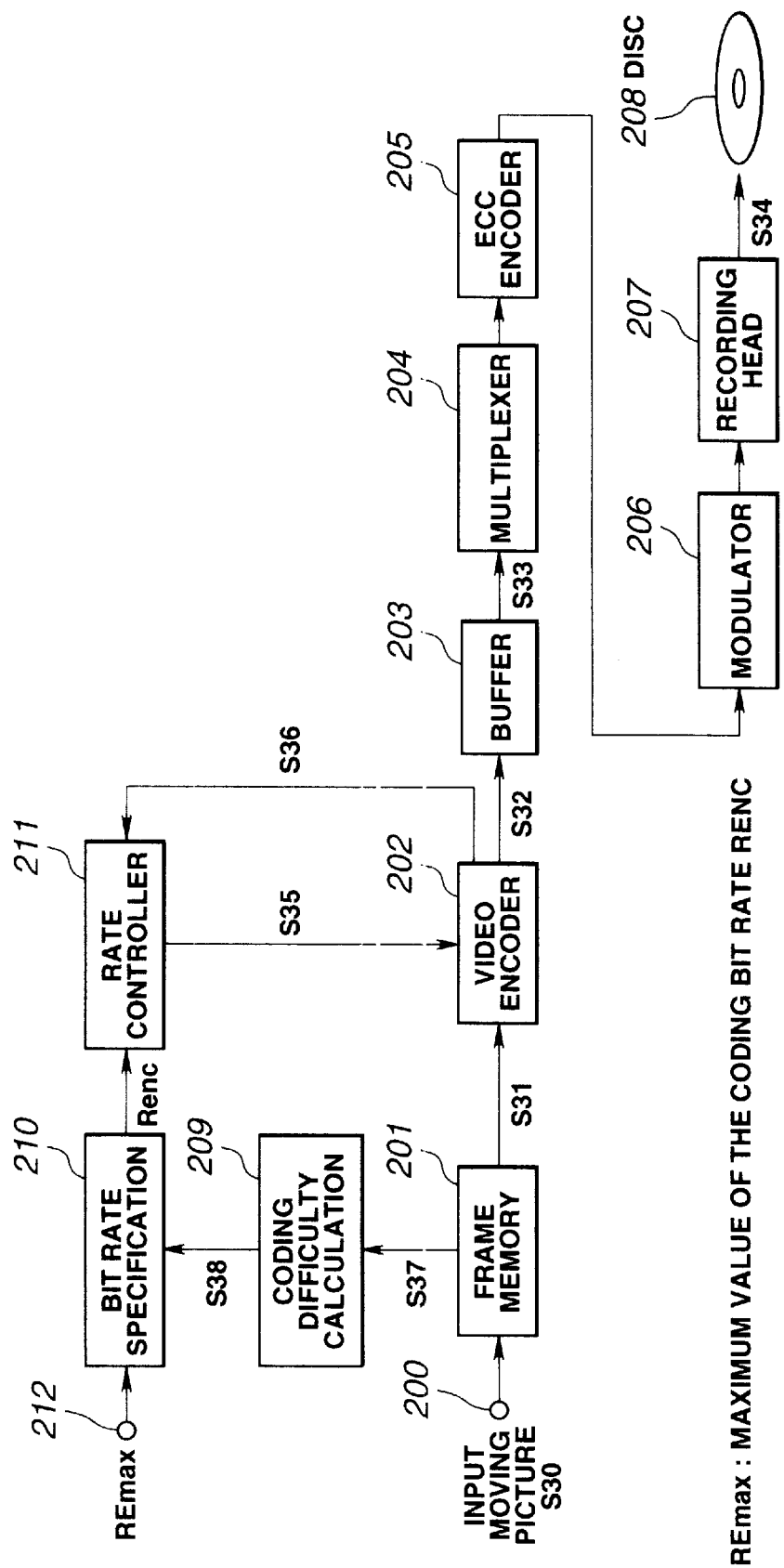
FIG. 4 is a block diagram showing a basic configuration of a recording apparatus according to an embodiment of the present invention.

In FIG. 4, a moving picture signal S30 supplied from a terminal 200 is stored in a frame memory 201. A coding difficulty counting circuit 209 calculates a coding difficulty S38 for each predetermined time of a video data S37 stored in the frame memory 201. A bit rate specifier 210, according to the coding difficulty S38 for a predetermined time, calculates a coding bit rate Renc for every predetermined time and specifies this coding bit rate Renc in a rate controller 211. It should be noted that the aforementioned predetermined time may be, for example, a duration of one GOP which is in the order of 0.5 seconds. The aforementioned coding difficulty and the Renc calculation methods are disclosed in the Specifications and Drawings of Japanese Patent Application 7-108860 and Japanese Patent Application 7-11418 filed by the applicant of the present invention.

A brief explanation will be given on the coding difficulty calculating circuit 209. This coding difficulty calculating circuit 209 determines statistical features or image characteristics of an input picture video signal as a coding difficulty. The coding difficulty calculating circuit 209 includes an intra-frame information analyzer and a frame-to-frame information analyzer. The intra-frame information analyzer calculates statistical information of luminance, chromaticity, and flatness of the input picture as image characteristics, whereas the frame-to-frame information analyzer calculates as the image characteristics of the input picture, for example, a statistical information of a motion amount of a moving picture. More specifically, the aforementioned image characteristic information are as follows. For example, the statistical information of luminance of the input picture is obtained by calculating an average value of luminance information for a predetermined time; the statistical information of the chromaticity of the input picture is obtained, for example, by calculating an average value of the luminance information for a predetermined time; the statistical information of the flatness of the input picture is obtained, for example, by calculating the dispersion value of the luminance signal for a predetermined time; and the statistical information of the motion amount of the input picture is obtained, for example, by calculating an average value of a motion vector amount for a predetermined time.

The aforementioned bit rate specifier 210 determines the coding bit rate Renc according to the coding difficulty S38 supplied from the coding difficulty calculating circuit 209. More specifically, the bit rate specifier 210 determines the coding bit rate Renc for every predetermined time according to the maximum value REmax of the coding bit rate Renc specified from a terminal 212 and the aforementioned coding difficulty S38. It should be noted that the coding bit rate Renc specified by the bit rate specifier 210 is equal to or below the maximum value REmax. The method to obtain this maximum value REmax will be detailed later.

The rate controller 211, according to the coding bit rate Renc, specifies a target coding bit amount S35 of a picture S31 supplied to a video encoder 202. Consequently, the video encoder 202 encodes the picture S31 so as to have the target coding bit amount S35. Moreover, the bit amount S36 actually generated in the video encoder 202 is supplied to the rate controller 211. The rate controller 211, when calculating the target coding bit amount S35 of the picture S31, assumes a bit occupation amount of an input buffer memory of a decoder and controls the coding bit amount of the frames successively supplied to the aforementioned video encoder 202 so that the input buffer memory of the decoder will not underflow or overflow.

The coded bit stream S32 from the video encoder 202 is supplied to a buffer memory 203.

A multiplexer 204 reads the bit stream S33 from the buffer memory 203 at a multiplex bit rate Rmux. The multiplex bit rate Rmux is a value greater than the maximum value REmax of the coding bit rate Renc. In the multiplexer 204, for a certain time interval, if the buffer memory 203 contains a bit stream, the bit stream S33 is read in from this buffer memory 203 at the multiplex bit rate Rmux and for a certain time interval, the data read out from the buffer memory 203 is halted and another bit stream of an audio (not depicted) is read in. Consequently, bit stream read in from the buffer memory 203 is carried out intermittently at the multiplex bit rate Rmux and zero. An average value for a predetermined time of the bit rate of the intermittent read in from the buffer memory 203 is equal to the coding bit rate Renc of the moving picture at that time.

The multiplexer 204 time-division multiplexes the bit stream S33 and another input bit stream of audio (not depicted) into a single bit stream.

This bit stream is added with an error correction code (ECC) by an ECC encoder 205 and supplied to a modulation circuit 206. In this modulation circuit 206, corresponding to the output from the ECC encoder, a predetermined modulation such as the 8-14 modulation is carried out.

The output from this modulation circuit 206 is supplied to a recording head 207 where a signal S34 is recorded on an optical disc 208.

Figure 5:
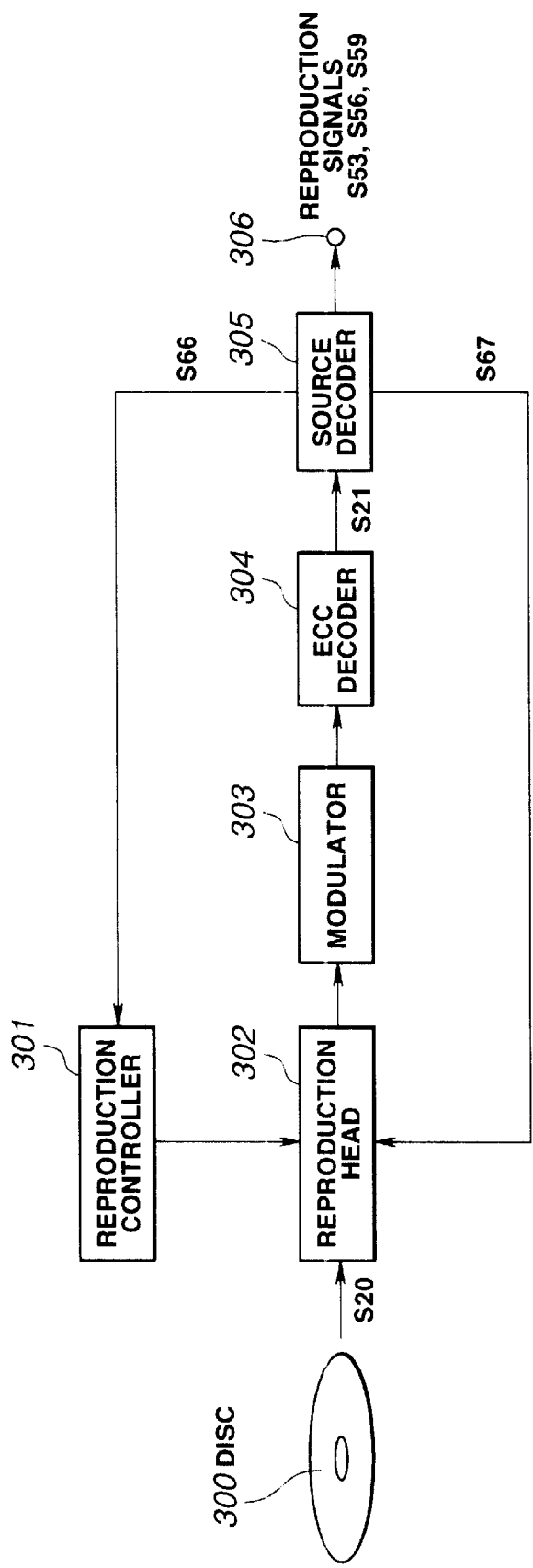
FIG. 5 is a block diagram showing a basic configuration of a reproduction apparatus according to an embodiment of the present invention.

Next, description will be directed to a decoding apparatus and method according to an embodiment of the present invention with reference to a reproduction apparatus shown in FIG. 5.

In FIG. 5, a disc 300 contains a moving picture coded signal recorded by using the recording apparatus explained with reference to FIG. 4. A reproduction head 302 reads in a data S20 from a disc 300. This data is supplied to a decoding circuit 303. The decoding circuit 303 carries out a decoding corresponding to the modulation circuit 206 of FIG. 4. The output of this decoding circuit 303 is supplied to an ECC decoder 304 and subjected to a decoding processing which corresponds to the ECC encoder 205 of FIG. 4. The ECC decoder 304 outputs a bit stream S21 which is supplied to a source decoder 305. The reproduction signals decoded in this source decoder 305 (S53, S56, and S59 which will be detailed later) are outputted from a terminal 306.

Here, the reading of the data S20 from the disc 300 is controlled by a reproduction controller 301. While the reproduction head 302 is reading the data S20, the input bit rate of the bit stream S21 from the ECC decoder 304 to the source decoder 305 is RBin. Moreover, while the reproduction head 302 halts data reading, no data is outputted from the ECC decoder 304.

The source decoder 305 of FIG. 5 has a configuration explained below with reference to FIG. 6.

Figure 6:
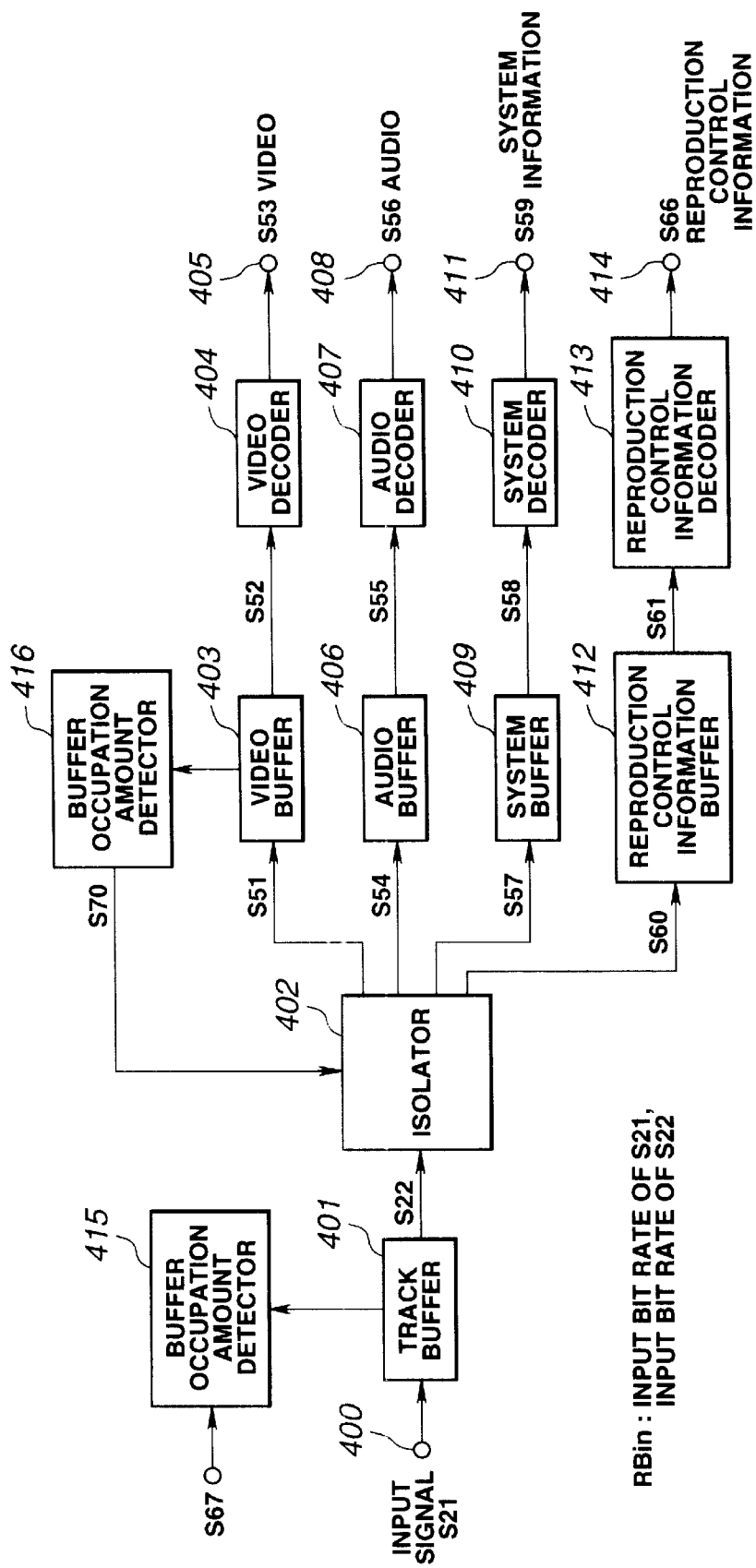
FIG. 6 is a block diagram showing a specific configuration of a source decoder.

In FIG. 6, the bit stream S21 supplied from a terminal 400 is inputted to a track buffer memory 401 at the bit rate RBin, and a bit stream S22 is inputted from the track buffer memory 401 at the bit rate RBin to an isolator 402.

Here, the bit stream S22 is a coded video signal, a coded audio signal, a system signal, and a reproduction control information which are multiplexed by time division. Here, the system signal includes an AV synchronous reproduction signal of the video signal and the audio signal. The reproduction control information is an information indicating a reproduction route of a video program recorded on the disc. This reproduction route is specified by a user through an editing operation.

The isolator 402 isolates from the multiplexed bit stream S22, a coded video signal S51, a coded audio signal S54, a system signal S57, and a reproduction control information S60, which are respectively supplied to a video buffer memory 403, an audio buffer memory 406, a system buffer memory 409, and a reproduction control information buffer memory 412.

A video decoder 404 reads a data S52 from the video buffer memory 403, decodes the data, and outputs a reproduction video signal S53. An audio decoder 407 reads out a data S55 from the audio buffer memory 406, decodes the data, and outputs a reproduction audio signal S56. A system decoder 410 reads out a data S58 from the system buffer memory 409, decodes the data, and outputs a system information S59. A reproduction control information decoder 413 reads out a data S61 from the reproduction control buffer memory 412, decodes the data, and outputs a reproduction control information S66. The reproduction control information S66 is supplied to the reproduction controller 301 of the reproduction apparatus of FIG. 5.

A buffer occupation detector 416 detects a bit occupation amount of the video buffer memory 403. When the video buffer memory 403 has become full, the buffer occupation detector 416 transmits a signal S70 indicating the buffer full to the isolator 402 so as to halt the isolation operation of the isolator 402. As a result, the input of the bit stream S51 to the video buffer memory 403 is stopped.

A buffer occupation detector 415 detects a bit occupation amount of the track buffer memory 401. When the track buffer memory 401 has become full, a signal S67 indicating the buffer full is outputted from the buffer occupation detector 415. This signal S67 is transmitted to the reproduction head 302 of FIG. 5 so as to halt the data read out from the disc 300. As a result, the input of the bit stream S21 to the track buffer memory 401 is stopped.

The aforementioned maximum value REmax of the coding bit rate of the video data shown in the recording apparatus of FIG. 4 is a value related to the bit rate RBin of the mutliplexed bit stream S21 supplied to the track buffer memory 401 of FIG. 6. It is necessary that the bit rate RBin be greater than a sum of the respective maximum bit rates of the aforementioned coded video signal S51, the coded audio signal S54, the system signal S57, and the reproduction control information S60.

Figure 1A:
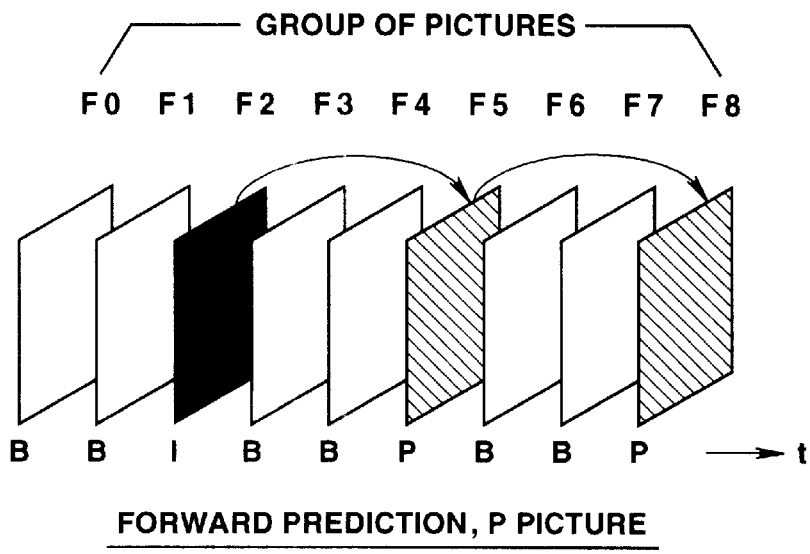
FIG. 1 explains the GOP.
Figure 1B:
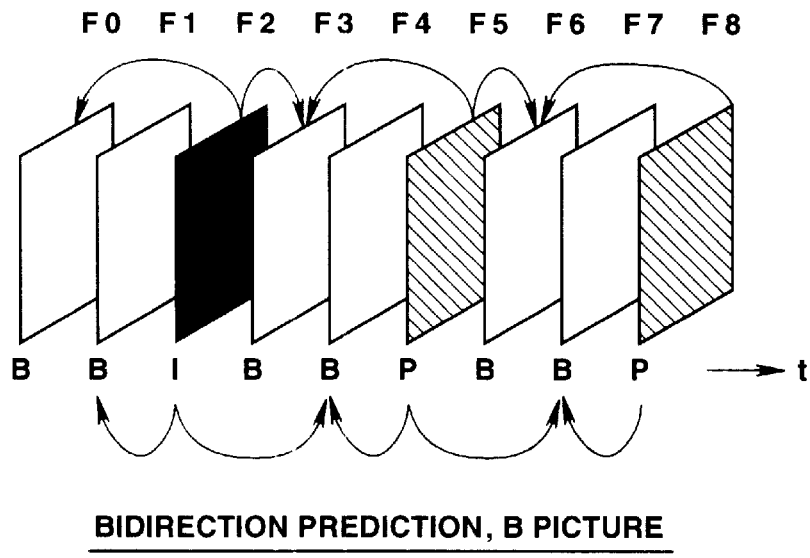
Figure 2:
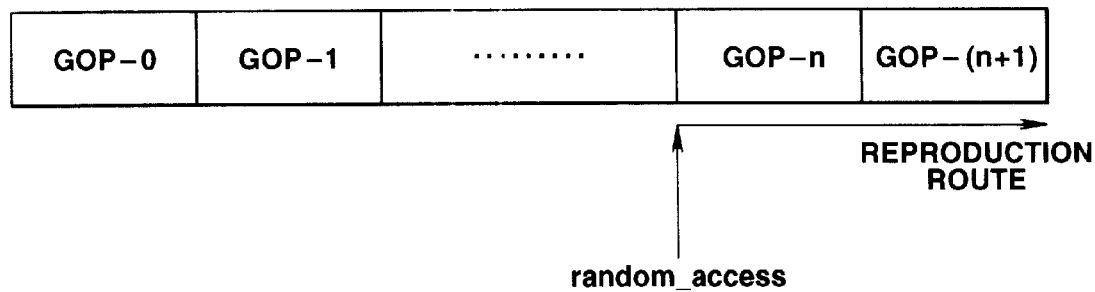
FIG. 2 explains a random access reproduction on GOP basis.

Here, the aforementioned maximum value REmax is determined, for example, as follows. The coded audio signal S54, the system signal S57, and the reproduction control information S60 are normally predetermined bit rates and accordingly, the bit rate RBin deleted by the sum of these three bit rates serves as a remaining bit rate from which a predetermined margin bit rate is deleted. A value obtained in this way is used as the maximum value REmax of the video coding bit rate. Description will now be directed to the operation of the source decoder 305 when a skip reproduction is carried out by the reproduction apparatus of FIG. 5, with reference to the aforementioned FIG. 3 and FIG. 1.

Figure 3:
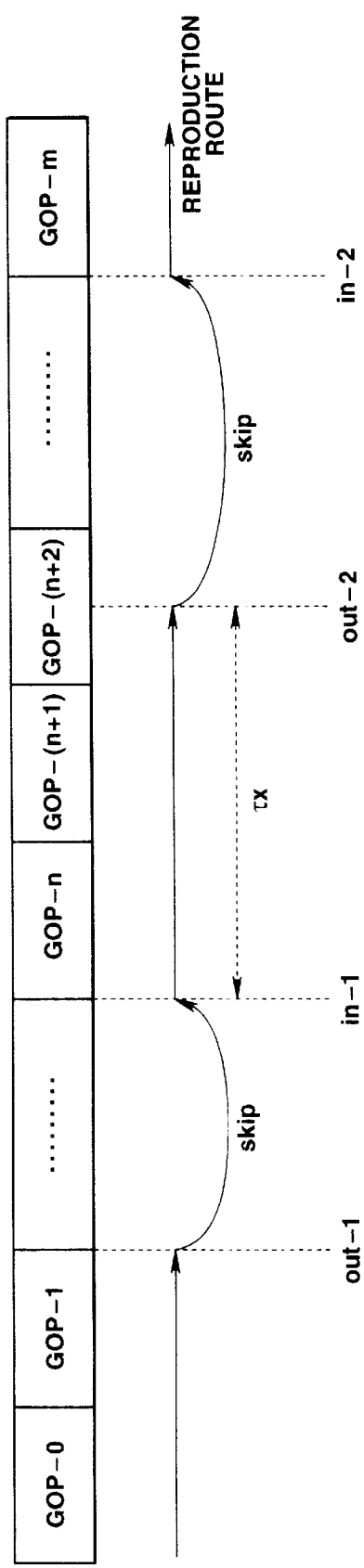
FIG. 3 explains an edition limit when carrying out a skip reproduction on GOP basis.
Figure 7A:
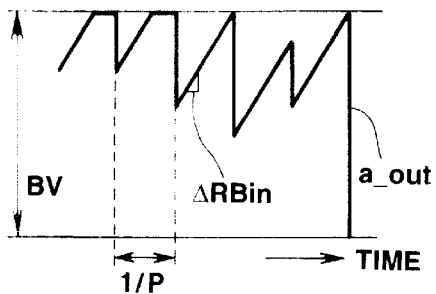
FIG. 7 shows transition of a bit occupation amount of the decoder buffer during a skip reproduction.
Figure 7B:
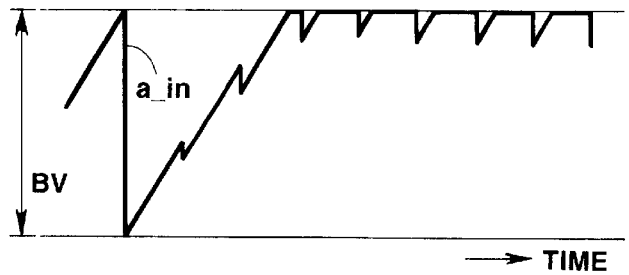

In the example of FIG. 3 where a coded bit stream of a continuous moving pictures of GOPs from GOP-0 to GOP-m is recorded on a disc, a skip is carried out from the out point (out-1) at the end of the first GOP (GOP-1) to the in point (in-1) at the head of the n-th GOP. FIG. 7A and FIG. 7B show the bit occupation amount transition of the input buffer memory of the decoder (hereinafter, referred to as a virtual decoder buffer, which corresponds to the vbv buffer in the MPEG) assumed when the m-th GOP (GOP-m) and the n-th GOP (GOP-n) are coded by the video encoder 202 of FIG. 4.

In FIG. 7A, the BV represents a size of the virtual decoder buffer. For example, in the MPEG2 FP@ML (Main Profile at Main Level), the BV is 1.75 Mbit. The bit occupation of the virtual decoder buffer is indicated by the slanting lines in the figure. The slanting angle of each straight line represents the input bit rate to the virtual decoder buffer and the value is the aforementioned bit rate RBin. The bit stream input to the virtual decoder buffer stops when the bit occupation has become full (=BV). In the figure, each of the perpendicular lines has a length corresponding to a bit amount of the coded frame. One frame is decoded for every 1/P seconds, instantaneously decreasing the bit occupation. Here, the P is 29.97 Hz in the television standard system NTSC (National Television system Committee) and 25 Hz in the PAL (Phase Alternation by Line). The moment of time when a coded frame is inputted to the virtual decoder buffer is coded in the SCR (System Clock Reference) or PCR (Program Clock Reference) of the MPEG multiplex bit stream when the video stream is multiplexed.

The example of FIGS. 7A and 7B shows a worst case for the decoder when carrying out a skip reproduction. That is, when carrying out a skip from the first GOP (GOP-1) to the n-th GOP (GOP-n), the bit stream I/O amount of the decoder buffer memory for reproducing pictures at the connection point becomes maximum. In FIG. 7A, the coded frame corresponding to the out point (out-1) of the skip reproduction in the first GOP (GOP-1) is the frame at the position indicated by a_out, and its bit amount is BV. Moreover, in FIG. 7B, the coded frame corresponding to the in point (in-1) of the skip reproduction in the n-th GOP (GOP-n) is the frame at the position indicated by a_in in the figure, and its bit amount is BV.

Figure 7C:
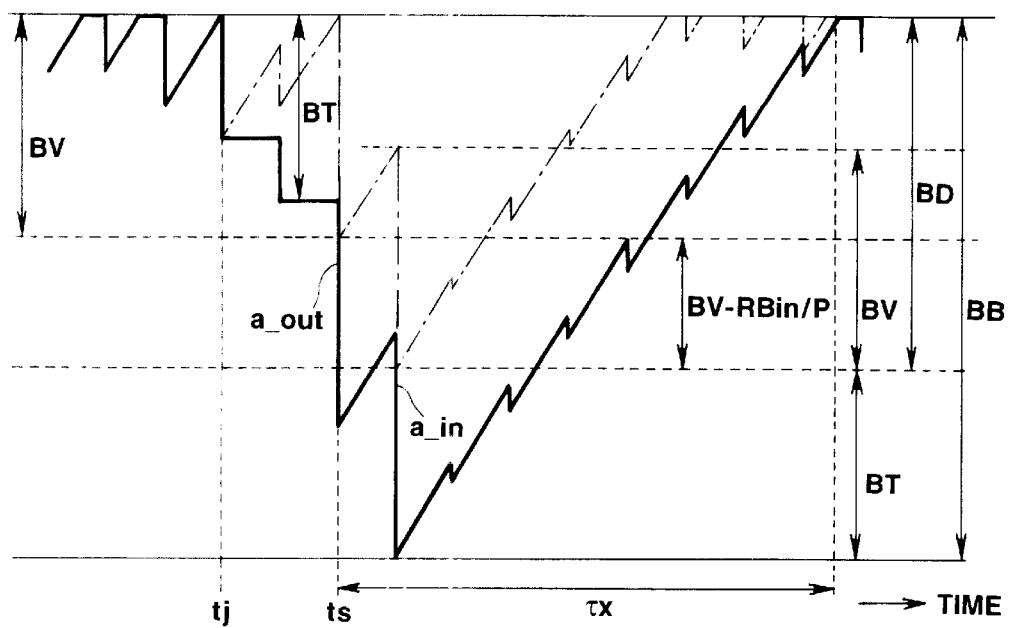

FIG. 7C shows a solid line of sawtooth shape showing a bit occupation transition of the virtual decoder buffer when carrying out a skip reproduction from the first GOP (GOP-1) to the n-th GOP (GOP-n). Explanation will be given on this FIG. 7C in relation to the operation of the source decoder 305 of FIG. 5. It should be noted that for simplification of the explanation, decoding of a bit stream of the video data alone will be described. In FIG. 7C, the size of BB corresponds to the total of the size of the track buffer memory 401 and the size of the video buffer memory 403 in FIG. 6. The total size of these two buffer memories 401 and 403 corresponds to the buffer memory of the decoder, which will be referred to as a decoder buffer below.

When the bit occupation of this decoder buffer has become full, decoding of the first GOP (GOP-1) is started, and at time tj the read in of the first GOP (GOP-1) to the decoder buffer is completed, starting search of the address of the n-th GOP (GOP-n) on the disc.

Next, at time ts the input of the n-th GOP (GOP-n) to the decoder is started. From the time tj to the time ts, input from the disc to the decoder buffer is halted and during this interval, the input bit rate to the buffer is zero. Immediately after the first frame a_in of the n-th GOP (GOP-n) is decoded, the decoder buffer bit occupation is zero.

After this, each of the frames of the n-th GOP (GOP-n) is decoded for every 1/P seconds. A bit stream is inputted to the decoder buffer at the bit rate RBin until the buffer becomes full and the input is stopped when the buffer has become full. In this case, the input timing of the coded frame to the decoder buffer is controlled so that an input is carried out any time if the decoder buffer has an empty area, ignoring the SCR or PCR, i.e., the input timing added to the coded frame of the multiplexed bit stream. As the maximum value REmax of the bit rate of the coded video data is smaller than the input bit rate RBin to the buffer, it is guaranteed that the decoder buffer bit occupation becomes full after the time TX at the latest In FIG. 7C, the least required size BB of the decoder buffer, i.e., the track buffer memory 401 (BT) and the video buffer memory 403 (BD) is expressed by the following expressions: BT=RBin*seek_time, BD=2*BV−RBin/P, BB=BT+BD. Here in the expression, the seek_time represents the maximum value of the time from the in point to the out point search during a skip reproduction. It should be noted that in FIG. 7C, the dotted line of the sawtooth trace from time tj represents the decoder buffer bit occupation amount when the aforementioned search time seek-time is zero. As the search time seek-time increases, the BT also increases. Moreover, the aforementioned time TX can be expressed by the following expression: TX=(BV+BT)/(RBin−REmax).

Thus, FIG. 7C explains a decoding of a video signal alone. As for the audio signal, by the isolator 402 of the decoder system of FIG. 6, a video stream of an audio signal corresponding to the first GOP (GOP-1) and the n-th GOP (GOP-n) are isolated and supplied to the audio buffer memory 406. Here, for carrying out a seamless video reproduction, the isolator 402 operates until the video buffer memory becomes full. Consequently, the audio buffer memory 406 may overflow before the video buffer memory 403 becomes full. In such a case, the oldest data in the audio buffer memory 406 is discarded from the buffer. Even if the oldest audio data is discarded, no adverse effect is caused for the hearing sense.

The video signal S53 reproduced by the video decoder 404 and the audio signal S56 reproduced by the audio decoder 407 are synchronized for output by the AV synchronous information of the system information S59 reproduced by the system decoder 410. Here, the AV synchronous information is, for example, a PTS (Presentation Time Stamp) in the MPEG multiplex stream.

Next, explanation will be given on a limit when specifying a skip reproduction by editing a video signal recorded on a disc prepared by the recording apparatus of FIG. 4.

When carrying out a skip reproduction, while the GOP of the skip destination is searched, the bit stream supply to the decoder buffer is halted. However, during this stop, the decoding operation should be carried out in seamless. For this, the edition is limited so that the decoder buffer will not underflow. This will be explained with reference to the aforementioned FIG. 3.

When a skip is carried out from the out point (out-1) to the in point (in-1) in FIG. 3, the aforementioned TX time is required at the maximum until the decoder buffer bit occupation becomes full again. For this, the sequence time from the in point (in-1) to the skip destination, i.e., the next out point (out-1) is set to a value equal to or above the TX.

By coding, editing, and decoding a video signal as has been described above, it is possible to realize a seamless skip reproduction on the GOP basis. That is, a user can edit the moving picture reproduction route on the GOP basis and reproduce it in seamless.

As is clear from the aforementioned, in the encoding apparatus and method according to the present invention, when encoding input digital signals in a coding group configuration consisting of a plurality of frames, the total of the maximum values of the coding bit rate of the respective digital signals is smaller than the input bit stream to the buffer memory used during a decoding, so that even if a user selects a video reproduction route by editing the coded bit stream, it is possible to carry out a seamless signal reproduction by decoding the signal through the selected reproduction route.

Moreover, in the decoding apparatus and method according to the present invention, when decoding a coded bit stream which has been coded in a predetermined coding group configuration consisting of a plurality of frames of a digital signal, the coded digital signal is accumulated at a stage preceding the decoding and if a skip reproduction is specified, accumulation is carried out ignoring the input timing information added to the coded digital signal if any empty area is present in the accumulation amount, so that even if the coded bit stream has been edited, the signal can be decoded as a seamless signal.

Furthermore, in the editing method according to the present invention, when reproducing from a recording medium and editing a coded bit stream coded in a predetermined coding group configuration consisting of a plurality of frames of a digital signal, in a case of a skip reproduction, assuming the first frame of the coded group is as a skip destination, the minimum value of the length from the skip destination to the next skip start point is set to a predetermined value, so that the signal subjected to this edition can be decoded into a seamless reproduction.

What is claimed is:

1. An encoding apparatus for encoding an input signal in a predetermined coding group configuration consisting of a plurality of pictures, said apparatus comprising:

an encoder for encoding said input signal;

a multiplexer for generating a bit stream from said encoded signal and a second encoded signal; and a controller for controlling an encoding bit amount of said input signal according to an estimation of a bit occupation amount of a buffer memory used during decoding, wherein an input bit rate to said buffer memory used during decoding is controlled to be greater than a total of maximum bit rates of said encoded signal and the second encoded signal.

2. An encoding apparatus as claimed in claim 1, wherein said controller sets the maximum bit rate of said encoded signal to approximately an output bit stream bit rate minus the maximum bit rate of the second encoded signal and a predetermined margin.

3. An encoding method for encoding an input signal in a predetermined coding group configuration consisting of a plurality of frames, said method comprising the steps of:

estimating a bit occupation amount of a buffer memory used during decoding;

encoding said input signal;

generating a bit stream from said encoded signal and a second encoded signal; and controlling an encoding bit amount of said input signal according to the estimating of the bit occupation amount of the buffer memory used during decoding, wherein an input bit rate to said buffer memory used during decoding is controlled to be greater than a total of maximum bit rates of said encoded signal and the second encoded signal.

4. An encoding method as claimed in claim 3, wherein the maximum bit rate of said encoded signal is set to approximately an output bit stream bit rate minus the maximum bit rate of the second encoded signal and a predetermined margin.

5. A decoding apparatus comprising:

an input for inputting a coded digital signal in a predetermined coding group configuration consisting of a plurality of pictures;

an accumulator for accumulating said inputted coded digital signal;

a detector for detecting a bit occupation amount of said accumulator;

a controller for controlling input of said coded digital signal into said accumulator according to said bit occupation amount of said accumulator and an input timing information added to said coded digital signal;

a decoder for decoding said coded digital signal which has been read out from said accumulator; and a reproduction control signal receiver for receiving a reproduction control signal concerning editing that had been added to said coded digital signal, wherein said controller supplies said coded digital signal to said accumulator ignoring input timing information that had been added to said coded digital signal if said accumulator includes an empty area in the bit occupation amount when said reproduction control signal specifies a skip reproduction with a skip from a skip start point to a skip destination point.

6. A decoding method for decoding a coded digital signal which has been coded in a predetermined coding group configuration consisting of a plurality of pictures, said method comprising the steps of:

inputting said coded digital signal;

accumulating said inputted coded digital signal;

detecting an accumulation amount of said coded digital signal; and controlling said accumulation of said coded digital signal according to said accumulation amount and an input timing information added to said coded digital signal, such that when a reproduction control signal concern ing editing that had been added to said coded digital signal specifies a skip reproduction with a skip from a skip start point to a skip destination, said coded digital signal is accumulated ignoring input timing information that had been added to said coded digital signal if said accumulation amount includes an empty area.

7. A decoding apparatus comprising:

an input for inputting a coded digital signal in a predetermined coding group configuration consisting of a plurality of pictures;

an accumulator for accumulating said inputted coded digital signal;

a detector for detecting a bit occupation amount of said accumulator; and a controller for controlling input of said coded digital signal into said accumulator according to said bit occupation amount of said accumulator and an input timing information added to said coded digital signal, wherein said coded digital signal is accumulated ignoring input timing information that had been added to said coded digital signal if said accumulator includes an empty area when a reproduction control signal concerning editing that had been added to said coded digital signal specifies a skip reproduction with a skip from a skip start point to a skip destination.

8. An editing method for editing and reproducing a recording medium containing a coded bit stream which has been coded in a predetermined coding group configuration consisting of a plurality of frames of a digital signal, said method comprising the steps of:

setting skip start points and skip destination points so that the minimum value of a length from a skip destination point to the next skip start point is a predetermined value; and controlling a skip reproduction according to said skip start points and skip destination points which have been set.

9. An editing method as claimed in claim 8, wherein the first frame of said coded group is set as said skip destination point.

10. An editing apparatus comprising:

a reproduction device for reproducing a recording medium containing a coded bit stream which has been coded in a predetermined coding group configuration consisting of a plurality of frames of a digital signal;

a setting device for setting skip start points and skip destination points so that the minimum value of a length from a skip destination point to the next skip start point is a predetermined value; and a controller for controlling a skip reproduction according to said skip start points and said skip destination points which have been set.

11. An editing apparatus as claimed in claim 10, wherein the first frame of said coded group is set as said skip destination point.

* * * * *